May 7, 1946.  G. A. VAUGHN  2,399,838
DIRT SCRAPING AND CARRYING VEHICLE
Filed April 13, 1940  6 Sheets-Sheet 2
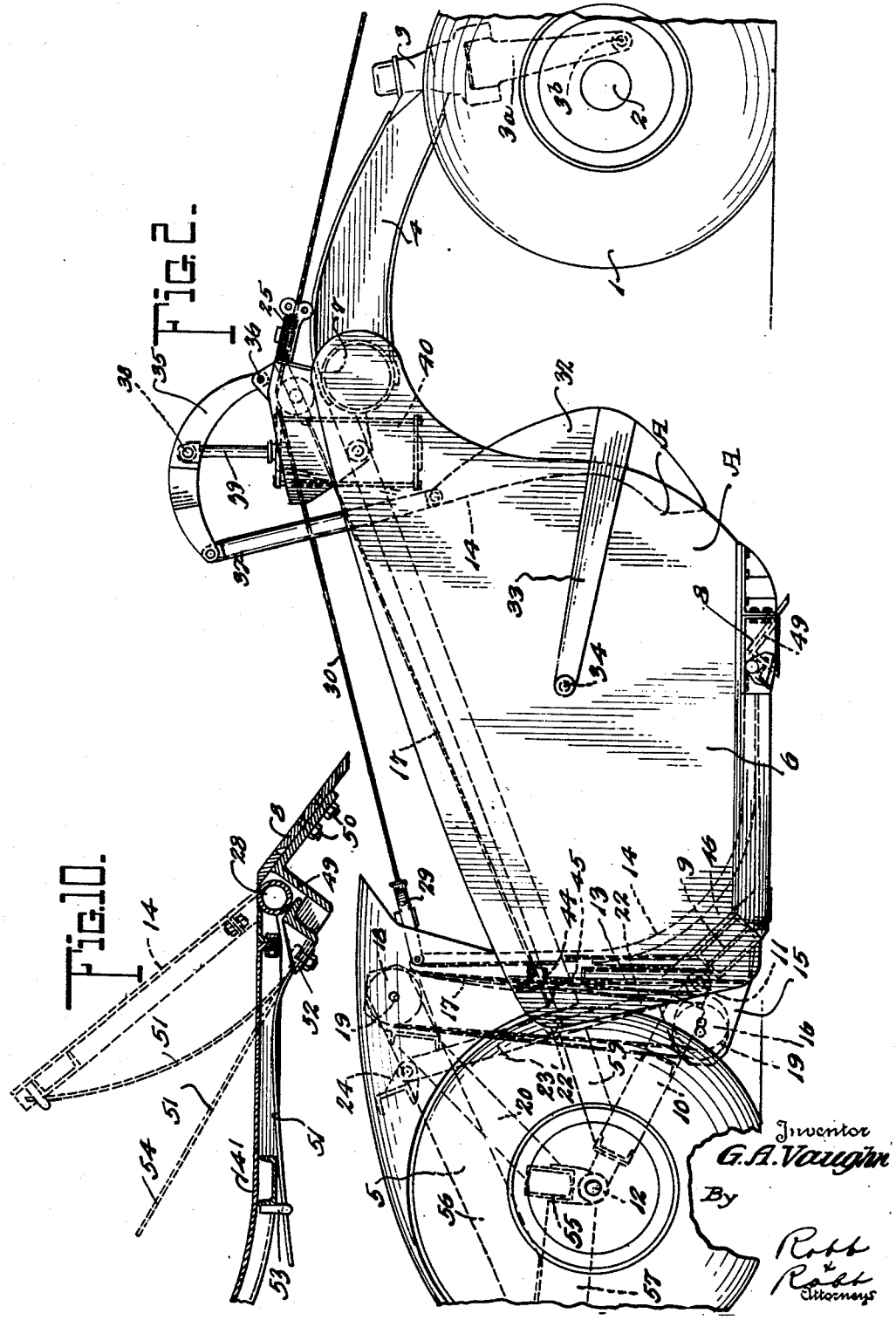

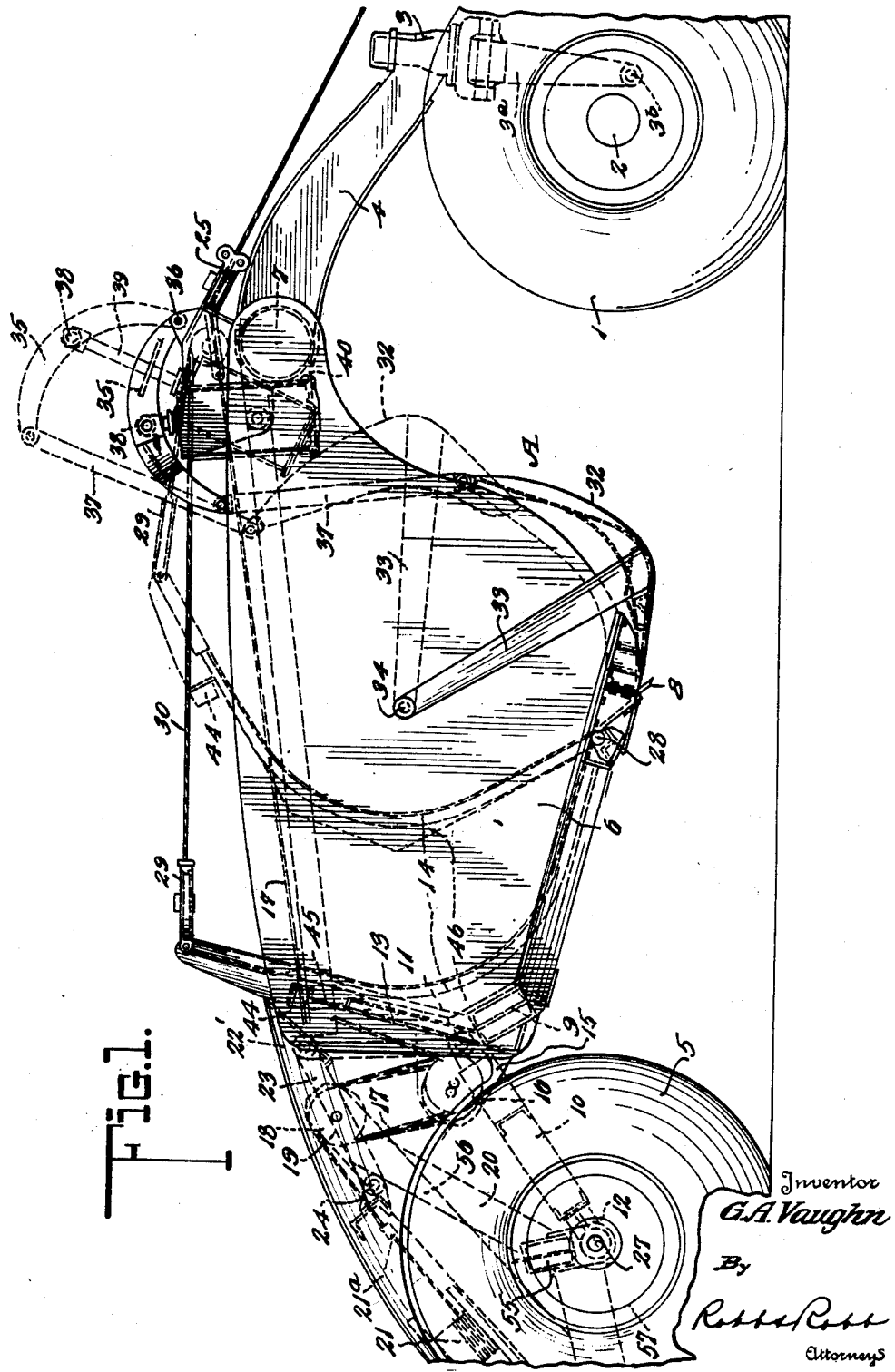

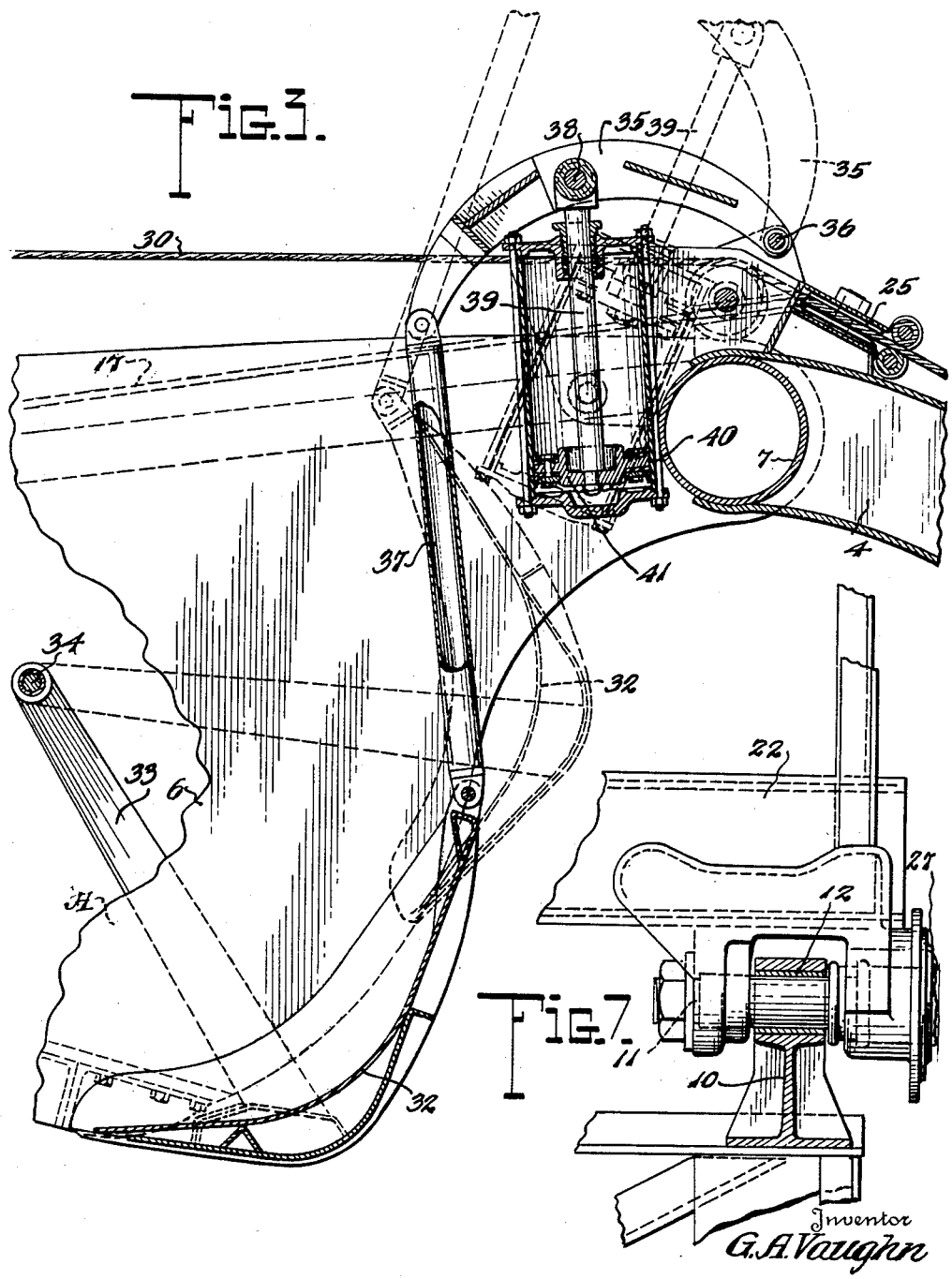

May 7, 1946.   G. A. VAUGHN   2,399,838
DIRT SCRAPING AND CARRYING VEHICLE
Filed April 13, 1940   6 Sheets-Sheet 4
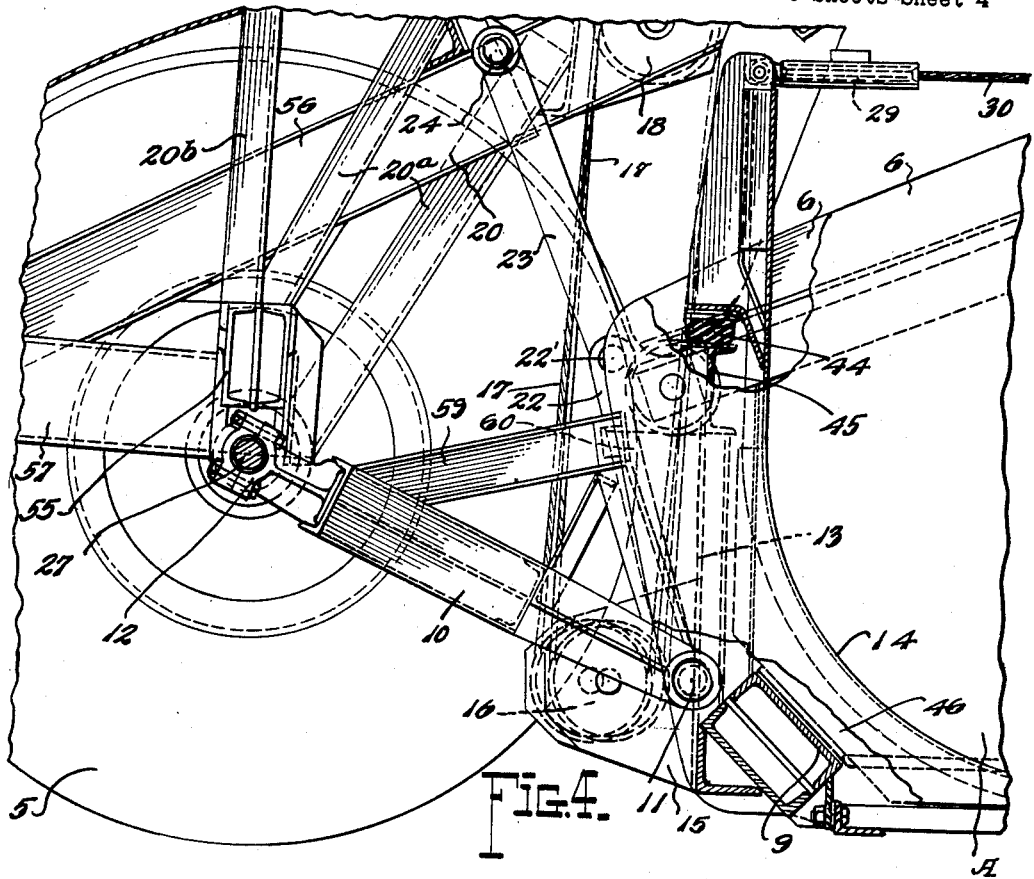
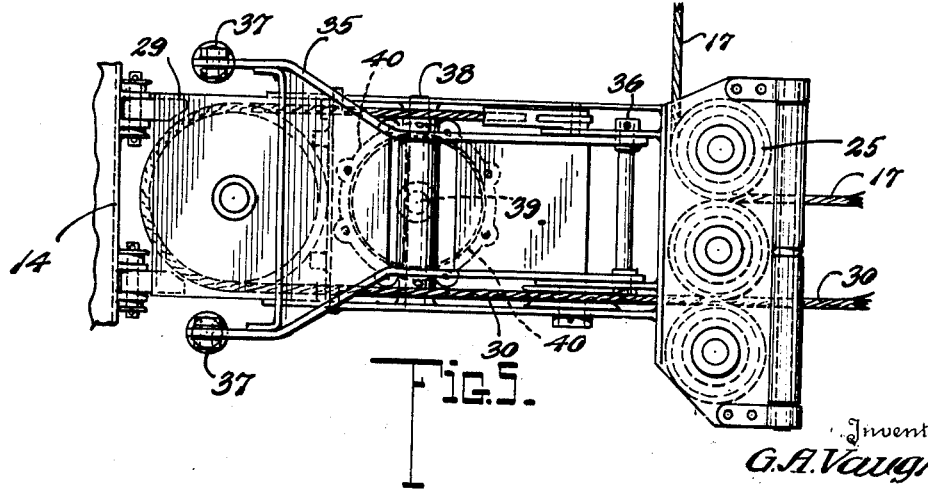
Inventor
G. A. Vaughn

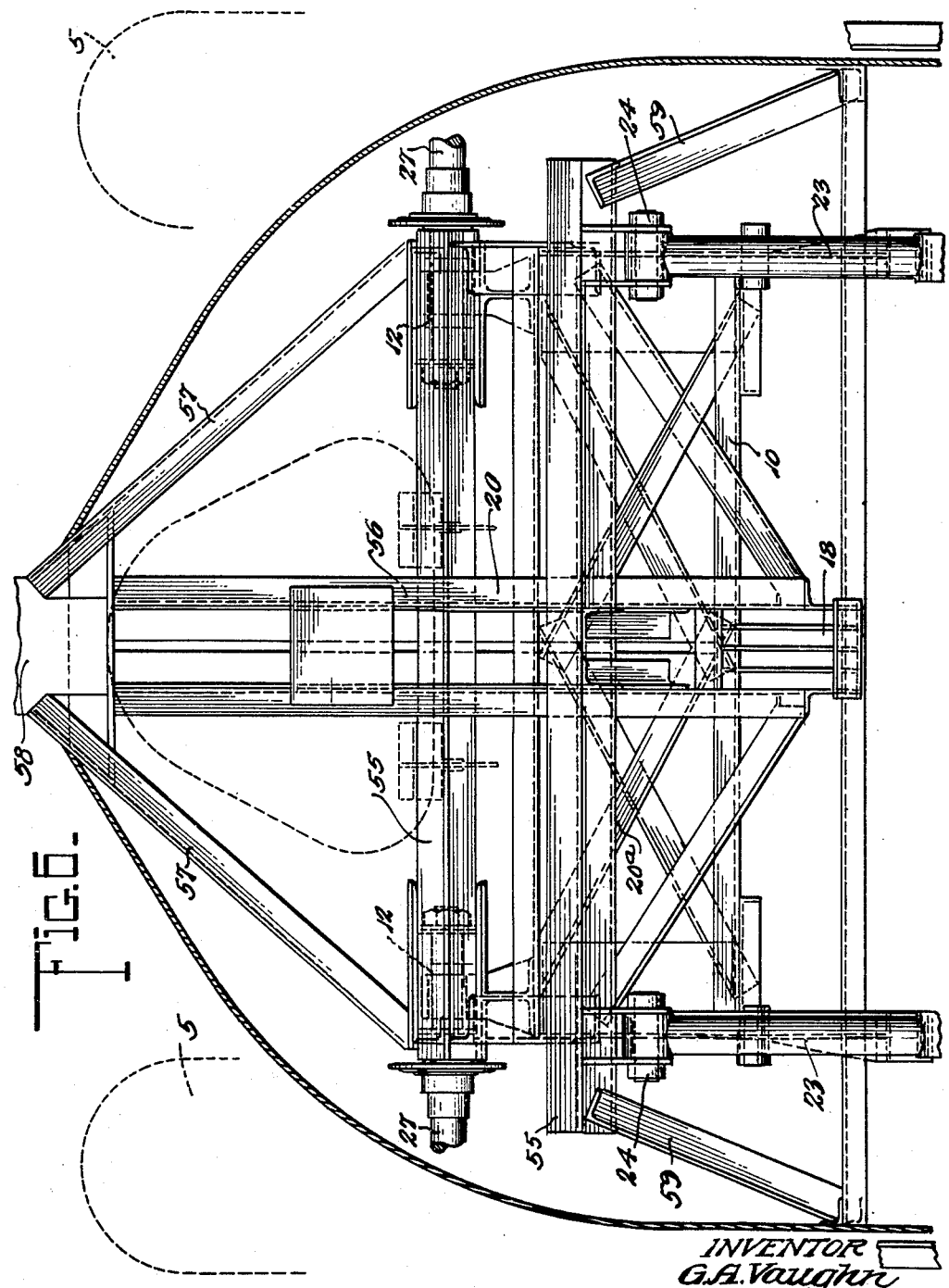

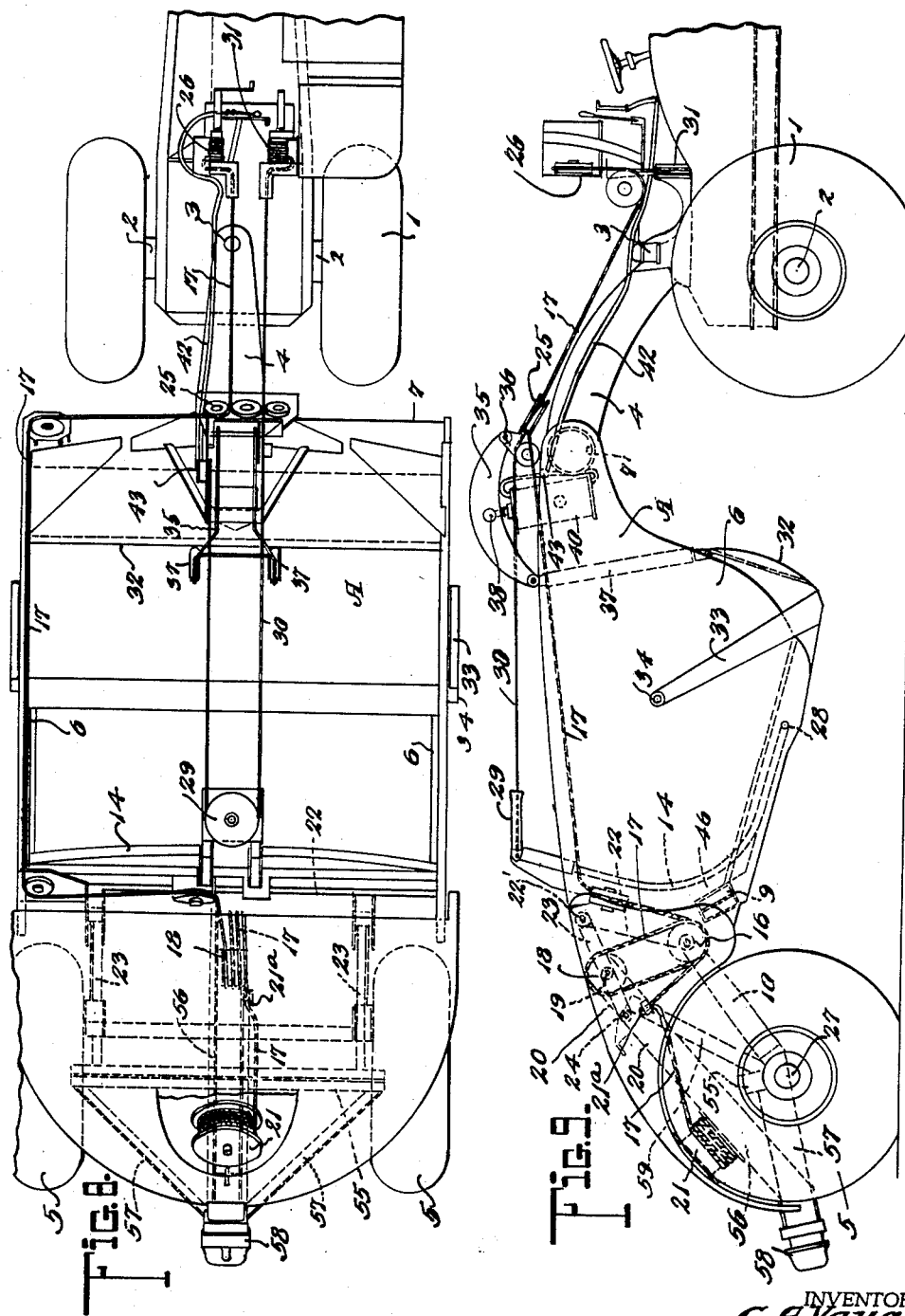

Patented May 7, 1946

2,399,838

UNITED STATES PATENT OFFICE 2,399,838

DIRT SCRAPING AND CARRYING VEHICLE

George A. Vaughn, Newton, Iowa, assignor to Koehring Company, Milwaukee, Wis.

Application April 13, 1940, Serial No. 329,531

2 Claims. (Cl. 37—126)

This invention appertains to the art of wheeled scrapers and particularly relates to that type of scraper vehicle which comprises instrumentalities for digging into and scraping up the dirt as the vehicle is propelled forwardly, a rear receiving and dirt carrying apron for the material scraped, adapted in a carrying position to facilitate the transportation of said material received thereby and then to be operated for ejecting or depositing the material, a front apron associated with the rear apron and scraping instrumentality openable so as to permit the dirt or material to be received upon the rear apron, and mechanism for raising the body of the vehicle and the material loaded thereinto for relatively high clearance from the ground during the travel movement of the vehicle, together with devices for operating the rear apron to and from its receiving and unloading positions and for proper operation of the front apron to close the front end portion of the body and rear apron and to be elevated for permitting the depositing of material or emptying of the same from the rear apron.

This invention involves primarily novel arrangements of the parts, a novel construction of the body and its supporting means relatively to the rear axle assembly of the vehicle, and other specific new features of structure that will appear more fully hereinafter as the description proceeds.

Among the general features of construction of this invention, of importance, is a certain provision including a special type of push frame mounted on the rear axle of the wheeled support for the rear of the receptacle or scraper body and cooperatively connected with the rear lower end of the scraper body in such a manner that freedom of movement upwardly is permitted, but when the body is in its scraping position the push frame will be substantially horizontally aligned with the lower portion of the body and capable of transmitting with high efficiency the pushing forces exerted against the rear of the scraper vehicle by a separate vehicle operating in conjunction therewith.

The rear construction of the vehicle likewise includes a supporting frame carried by the rear axle, capable of movement, and between which frame and the push frame is arranged elevating means for the body to raise the same for its traveling position properly cleared from the ground.

Another important feature of the invention is the employment for the front apron of specially devised positive raising and lowering instrumentalities adapted to be independently controlled relatively to other operations of the vehicle parts and said front apron is specially constructed in conjunction with the operating means therefor so as to enable it to automatically raise upon meeting an obstruction in the path of the traveling vehicle.

In the drawings:

Figure 1 is a side elevation of a dirt carrying vehicle embodying the essential features of the invention, dotted lines illustrating the receiving and dumping positions of the rear apron and the closed and opened positions of the front apron; also the extent of movement of the parts for raising the front apron to effect the opening action thereof.

Figure 2 is a view similar to Figure 1, but illustrating the body of the vehicle in its lowered position as when the scraper blade is in action to engage the earth and scrape the material into the body to be carried by the rear apron, the front apron being in upraised condition to permit the filling of the body with the dirt being handled.

Figure 3 is a fragmentary view largely in vertical section, showing more particularly the front portion of the body and rear portion of the draft beam with the fluid pressure mechanism employed to raise and lower the front apron, the latter shown in its lowered position in full lines and upraised position in dotted lines.

Figure 4 is a view similar to Figure 3 but illustrating the manner of mounting of the body in relation to the rear axle assembly, the mode of supporting the rear apron upon resilient or rubber pads carried by a crossbar of the body, and the auxiliary supporting shoes on the rear apron for engagement with a cross beam of the body to mainly carry the load of the contents of the body and rear apron when received thereby.

Figure 5 is a plan view partly broken away and illustrating more particularly the fluid pressure operated mechanism for raising and lowering the front apron and cable guiding means for the cables that are employed to raise the body and aprons bodily for travel clearance, and for independently operating the rear apron to raise and lower the same for its proper action having to do with the ejecting or depositing of the contents of the body largely received and supported thereby.

Figure 6 is a partial top plan view showing more particularly the assembly of parts at the rear of the vehicle and the encasing hood or shell partially enclosing same.

Figure 7 is a detail view showing the pivotal connection of one of the link members that connects the rear axle frame assembly with the lower rear portion of the body.

Figure 8 is a plan view diagrammatically illustrating the vehicle structure and bringing out more clearly the arrangement of the control means for the lifting cables for the body and rear apron and the control means for the front apron lifting and lowering fluid pressure means.

Figure 9 is a diagrammatic side view showing more particularly the construction diagrammatically illustrated in Figure 8.

Figure 10 is a partial longitudinal vertical sectional view through the scraper blade and the rear apron, showing the spring construction cooperating with the rear apron.

Since in certain particulars the general construction of the dirt carrying or hauling vehicle of this invention is similar to known types of these vehicles, only general reference will be made to some of the features of the construction. It is notable that the vehicle of the invention is of the type which is designed to be propelled or pulled forwardly by means of a power traction vehicle of some kind comprising the rear wheels 1, axle 2, and universal joint or draft connection 3, the latter suitably attached to the front drawbar or beam 4 of the vehicle. Strictly speaking, therefore, the dirt carrying vehicle itself is a two-wheeled vehicle having only the two rear wheels 5, and operating as a trailer.

At its rear end the drawbar 4 supports the front end of the body of the vehicle generally designated at A, said body comprising sides 6 in spaced relation. Each side is made up of a suitably fabricated construction that may comprise spaced plates and reinforcing channels or plates, or similar shapes interposed between said spaced plates, this being the generally used type of construction. The sides 6 of the body are rigidly connected at their front upper ends to a crossbar 7 at the rear end of the drawbar 4. The connection 3 is mounted on the upper end of a supporting member 3a which is pivotally connected at 3b to a part (not shown) of the power traction vehicle; so that said body, including the sides, may swing upwardly and downwardly between the limits of positions illustrated in Figures 1 and 2, the upper traveling position shown in Figure 1 and the lower scraper and dirt receiving position shown in Figure 2.

At the lower portions of the sides 6 near the front ends thereof is carried the rigid scraper or blade 8, the same of course adapted to be raised and lowered with the sides 6. At the rear portions thereof the sides 6 are connected by a cross beam 9 rigidly attached to the sides and forming with the latter and with the scraper 8 a body unit for the vehicle adapted to be raised and lowered in the manner previously mentioned. The cross beam 9 is connected by a lower push frame link structure 10 with the rear axle frame assembly of the vehicle, the connections including the pivots 11 at the front ends of the push frame and the pivot connections 12 at the rear ends of the push frame.

A cross plate 13, suitably reinforced by channels is secured to the cross beam 9 and the sides 6 of the body at the rear portion and in rear of the rear apron 14 to be hereinafter described more fully, and said cross plate 13 has a rearwardly projecting bracket 15, preferably detachably connected thereto, and carrying multiple sheaves 16 about which pass the preferably eight or ten part lifting cable means 17 which is reeved about the sheaves 16 as generally illustrated in Figures 8 and 9, and also Figures 1, 2, and 4. The cable 17 is likewise reeved about the multiple sheaves of a multiple sheave block 18 supported at 19 which is carried by the upper portions of the supporting frame member 20.

From the sheave block 16 the lifting cable 17 extends rearwardly to a reserve cable drum or reel 21 and a number of winds of the cable are made around said drum or reel 21. The cable is directly dead-ended on the frame of the rear axle assembly at a point 21a intermediate the sheave block 16 and the reel 21 so that whenever the cable portion reeved about the block 18 and the multiple sheaves or block 16 is unduly worn, a fresh portion of the cable 17 may be unwound from the reel 21 and brought into cooperation with the sheave means.

The lower part of the rear end portion of the body A comprising the rigid structure 22 rearwardly of the cross plate 13 is connected to the pivots 11, the upper part of the structure 22 being connected by pivots 22' to links 23 that are attached pivotally at 24 to the upper portion of the rear axle frame comprising the rigid members 20, 20a and 20b, of which the member 20 has been previously referred to.

As shown in Figures 8 and 9, the cable 17 leads from the lower sheaves 16 forwardly and upwardly to a point adjacent the top of the rear portion of the body, thence transversely of the rear portion of the body of the vehicle in an outward direction, thence forwardly between the plates of a side 6, thence in a reverse inward direction to pass over a sheave 25 at the rear end of the drawbar 4, and thence forwardly to a winding drum 26 which is carried by the traction vehicle by which the dirt carrying vehicle of the invention is pulled or propelled. By the winding action of the drum 26 pulling forwardly the cable 17, the portions of the cable reeved about and between the sheaves 18 and 16 will be caused to lift the lower rear portion of the body, raising the body comprising the rigidly connected parts or sides 6 and other similarly connected parts so that the elevating movement is substantially about the pivot 3b as an axis, the extent of raising movement being typified by the showing in Figure 2 with the body lowered and the showing in Figure 1 with the body elevated. In the lowered position of the body, the scraping and dirt receiving action takes place, whilst in the upper position of the body, elevated to any degree of clearance desired by the operator, the traveling of the vehicle is caused to the place where the dirt or load received by the body is to be deposited or spread upon the ground.

It will be apparent that upon the raising of the body in the manner described, the push link or frame 10 pivots around the rear axle or axis support 27 therefor. Likewise, the links 23 and pivots 22' and 24 connecting the rear portion 22 of the body with the upper portion of the axle frame assembly 20 and the front end of the push link or frame 10 have a toggle movement during the raising action from the nearly aligned positions thereof in the lowered position of the body to the angular positions thereof in the elevated position of the body as typified in Figures 2 and 1, respectively.

Next will be described the arrangement and operation of the rear apron 14 previously referred to, this apron being a curved plate, the front lower end or edge of which is pivotally supported by the cross member 28 connected to and extending between the sides 6. To the upper end or portion of the rear apron 14, which is the upper extremity of the back of the apron when the apron is lowered, is attached a pivot block 29 carrying a sheave around which a cable 30 passes. The cable 30 is dead-ended at one end adjacent to the rear portion of the drawbar 4 and passes forwardly at its other end to a winding drum 31 carried by the traction vehicle and operated under the control of a lever or other similar instrumentality by the driver of the traction vehicle. The winding of the cable 30 on the drum 31 will cause a pulling forwardly of the sheave block 29 and an elevating, dumping, or ejecting action of the rear apron 14 by shifting the said apron from the position in full lines in Figure 1 to the position in dotted lines.

Effectively speaking, the apron 14 constitutes a bottom and back member for the body of the vehicle comprising the sides 6 and other parts previously described to thus constitute the body with said apron a receptacle for receiving the dirt or other material scraped into the same and to be transported thereby.

The operation of the rear apron 14 is independent of the operation of raising and lowering the body A.

A front apron for the body of the vehicle, and in cooperation with the rear apron 14 and the sides 6, is used, and is designated 32. Said apron 32 is carried by a pair of arms 33 rigidly attached at their lower ends to the apron at opposite sides of the latter and arranged at the outer sides of the side members 6 of the body A. The upper ends of the arms 33 are pivoted to the sides 6 at 34 and enable the apron 32 to be swung upwardly and downwardly for the purpose of opening and closing, respectively, the front portion of the body A in advance of the scraper 8. The angular formation of the apron 32, and its disposition, permit it to yield upwardly if a rock or other obstruction is met thereby in the forward movement of the vehicle, this action being permitted by the apron actuating means.

The means for raising and lowering the apron 32 includes a lifting frame made up of spaced arms 35 pivoted at 36 to the rear end of the drawbar 4 above the axis of crossbar 7. The arms 35 are attached by links 37 to the upper end portion of the apron 32.

For raising and lowering the frame 35, suitable mechanism is availed of, including a cross shaft 38 connected to the arms 35 of the lifting frame intermediate the ends of the latter, and with which shaft 38 is pivotally connected the piston rod 39 of an air fluid pressure unit which includes the cylinder 40 and the piston 41.

A push-pull control device 42 leads to an air valve 43 adjustable to feed air to the upper and lower ends of the cylinder 40 so as to cause positive and speedy down and up movements of the piston or actuating rod 39. Such movements of the member 39 will, of course, lower and raise the lifting frame arms 35, links 37, and the front apron 32 in an obvious manner. The actuation of the control device 42 is effected by a suitable manual lever on the traction vehicle, as diagrammatically illustrated in Figures 8 and 9, and fluid may be supplied to the air valve 43 from any conveniently arranged pressure tank carried by the traction vehicle.

In reference to the supporting of the rear apron 14, it is notable that near the upper portion of this apron at its rear are carried one or more rubber or resilient cushion blocks 44. These blocks normally support the apron and a portion of its load by engagement with the cross member or channel 45 which is secured to the cross plate 13 and has connections with the rear portions of the sides 6 near the upper rear ends thereof. The members 44 cushion and limit the movement of the apron 14 when returning to its lowered dirt receiving position. When the load of the material scraped into the vehicle body is received upon the apron 14, the cushions 44 will give or yield somewhat to permit the apron to move downward, whereupon shoes 46 attached to the rear of the apron 14 will engage with the cross beam 9 at the front side of the latter so that the weight of the apron and load thereon will finally be limited and sustained by the member 9; the position of the parts as last mentioned is illustrated by Figure 2.

In the operation of the scraping and dirt hauling vehicle of the present invention, the parts are arranged as in Figure 2 in the loading operation. That is to say, the body A is lowered and the scraper 8 is adapted to scrape dirt from the surface operated upon, while the apron 32 is elevated and the body of the vehicle is thus open at the front end. The apron 32 is preferably only elevated an amount sufficient to permit free entry of dirt to allow the dirt to build up between the rear apron 14 and the front apron 32. When the material has been loaded into the vehicle body, the fluid pressure means including the lifting frame parts 35 and links 37 are operated for closing the front apron 32. The positive actuation of apron 32 by the fluid pressure means allows for closing action thereof, notwithstanding the weight of dirt which may be resting thereon. Thereupon, the cable means 17 is operated for raising the body A bodily until the operator has elevated the same sufficiently for the clearance from the ground which it is desired to have with respect to the location of the blade 8 and the bottom of the vehicle established by the lower portion of the rear apron 14. With the body A elevated for the proper clearance, the traction vehicle pulling the dirt carrying vehicle is caused to transport the latter by proper travel to the place where the contents of the dirt hauling vehicle are to be dumped or spread. Thereupon, the front apron 32 is elevated to open the front portion of the body A and the cable means 30 is caused to be operated to raise the rear apron 14 about the pivotal axis 28 thereof, this action causing the material deposited in the body A to be forcibly ejected or discharged from between the sides 6 of the body and through the space below the front apron 32 and the lower front ends of the said sides 6.

In actual operation the means for actuating the body A to elevate the same and for lowering the front apron 32 may be operated about the same time, though by the independent control means therefor, in order to facilitate the commencement of the travel movement of the vehicle.

During the elevating of the body of the dirt hauling vehicle, which of course involves the corresponding elevation of the rear apron 14, the rear wheels of said vehicle will move slightly rearwardly and thence forwardly with respect to the body unit as an incident to the articulation of the connections intermediate the axle frame unit and the body unit.

In connection with the raising and lowering of the rear apron 14, there is provided resilient means for assisting in cushioning the movement of this part, reference being made to Figure 10 of the drawings. The supporting member 28 to which the rear apron 14 is pivotally connected is mounted on a rigid supporting structure indicated as a whole by the numeral 49 and to which the scraper blades 8 are secured by bolts 50. A spring 51 is connected at one end to the supporting member 49 by means of a clamping member 52. The other end of the spring 51 is secured to a holding device 53 which is rigidly connected to the rear apron 14, the holding device 53 permitting movement by the spring 51 endwise with respect thereto. In the lower position shown in full lines, the spring 51 is under a tension urging the rear apron upwardly to assist in the raising of the apron 14. In the up position of the apron 14, as indicated by dotted lines, the spring 51 is under a tension urging the apron downwardly to its lower position. Intermediate these two positions there will be a neutral position of the spring 51 as indicated by the dotted line 54 and in which position there will be no tension on the spring 51. Accordingly, it will be apparent that the spring 51 acts as a cushioning means as the apron 14 goes to or from its upper and lower positions, and the tension imparted to the spring as the apron goes to such positions will assist in returning the apron 14 to the position from which it has moved. It will be understood that a plurality of springs 51 and associated parts may be employed and spaced transversely of the body unit with respect to the rear apron 14.

It will also be noted that the supporting frame 20, the push frame or push links 10, and the upper links 23 cooperate with each other with respect to the operation of the scraper. Having reference particularly to Figures 4 and 6, it will be noted that the supporting frame 20 is a substantially rigid supporting structure having a cross member 55 rigidly connected to the axle 27, the central main support 56 on the upper end of which the sheaves 18 are mounted being supported by the transverse section 55 through the compression members 20a and 20b. The lower end of the central supporting member 56 is connected to the transverse section 55 by compression members 57. The lower end of the supporting member 56, together with the ends of the compression members 57 form a bumper 58 to which the pusher plate of a tractor may be applied for imparting a forward movement to the scraper body.

In addition to forming a support for the lower end of the supporting member 56, the compression members 57 also serve to transmit force through the push links or push frame 10 to the scraper blades 8 in a novel manner. By reason of the pivotal connections 11 and 12 connecting the body of the scraper and the axle 27 to the pusher frame 10, the pushing force from a tractor may be transmitted directly through the compression members 57 and the pusher frame 10 to the sides 6 of the scraper body. In this manner the force is transmitted directly in a practically straight line to the scraper blades 8 for assisting in the digging action when the scraper body A is being loaded. It will also be noted that the push frame 10 is provided with rigid supporting members 59 for engaging with the upper rear edge of the scraper body, as at 60, when the scraper body is in its lowered position as shown in Figure 4, the members 59 thereby serving as an additional support for the body of the scraper in such position. The members 59 also operate to prevent the rear structure and wheels from being raised off the ground when an excessive pushing force is being applied by a tractor to the bumper member 58.

In the raising and lowering movements of the scraper body, the rear section 22 of the scraper body, connecting links 23, push links 10, and support frame 20, together with the pivotal connections 11, 12, 22' and 24 form an articulated structure in the nature of a parallelogram which operates in a manner to provide the maximum of clearance for the scraper body when it is in its raised position. This action will also operate to shorten the wheel base for better maneuverability in a manner which will become apparent. In the lowered position of the scraper body as shown in Figure 4, it will be noted that the pivots 11, 22' and 24 occupy a substantially aligned position. As the cable 17 is operated to impart a raising movement to the scraper body, the pivots 11 and 22' are moved upwardly to the position shown in Figure 1. This action results in a relatively small movement of the pivot 24 in a direction rearwardly of the scraper body from the position of Figure 4, and a relatively small movement of the pivot 12 toward the scraper body from the position shown in Fig. 4. This action results in a drawing of the wheels 5 inwardly toward the scraper body and a slight tilting movement of supporting frame 20 about axle 27 in a counter-clockwise direction. Accordingly, it will be noted that the tilting movement of the supporting frame 20 will be transmitted through the cable 17 to give an additional lift to the scraper body, thereby increasing the clearance of the scraper body, with respect to the ground, in its raised position. However, such tilting movement of the supporting frame 20 will not change the position of the bumper 58 in an amount sufficient to prevent its cooperation with a tractor when the scraper body is in its raised position.

From the foregoing it will be noted that the connections of the links 23 and pusher frame 10 to the supporting frame 20 and to the rear of the scraper body cooperate in a novel manner in effecting a raising action of the scraper body to provide the maximum of clearance between the scraper body and the ground. It will also be noted that the maximum clearance is important with respect to the action of the rear apron 14 in effecting discharge of the contents deposited in the scraper body, the elevation of the scraper body assisting the apron 14 in effecting its discharge action.

It is notable that the operating means for the front apron 32, involving as it does the air control devices including the piston 41, cylinder 40 and parts 38, 39 and 35 permits the apron 32 to move upwards freely if it meets with an obstruction, as previously mentioned. This action is allowed notwithstanding that the air control for the movement of the piston 41 is a positive control and will enable a high speed closing and opening movement to be imparted by the piston to the apron 32. Such movement is furthermore controllable entirely independently of the rear apron 14 and independently of the raising movement of the receptacle body for the scraper vehicle. Obviously, a quick adjustment of the position of the apron 32 is desirable in controlling the degree of opening thereof for spreading of the dirt or material and such action is likewise desirable for quick and positive closing of the apron preliminary to the commencement of the travel movement of the vehicle with the body A elevated for proper clearance from the ground in said traveling action.

It will be noted that the rear apron 14, front apron 32, and scraper blade 8 cooperate in a novel manner in effecting a spreading action of the dirt deposited in the body A. As pointed out heretofore, during scraping action, the dirt is deposited on the bottom of the apron 14 and builds up between the rear of apron 14 and on the apron 32. The air cylinder 40 and connections to the apron 32 permit positive actuation of the apron 32 in two directions notwithstanding the load which may be resting on the apron 32. In effecting a spreading action, the rear apron 14 is elevated to eject the dirt and the apron 32 is elevated an amount sufficient to control the rate at which the dirt is dumped to control the depth of the spread. The elevation of the front apron 32 during spreading action is preferably the same as when the scraper is being used for excavating work with the rear apron 14 lowered.

To effect a leveling action, the body A is lowered until the scraper blade 8 is a distance from the ground equal to the depth of the dirt to be deposited or spread. The blade will thus level off the dirt which will be deposited in a ribbon-like layer. If high spots are encountered on the surface of the ground on which the dirt is being deposited, then the blade 8 will strike and remove such high spots. The dirt thus removed will be received in the body A and will build up between the apron 32 and apron 14 where it will be available as soon as low spots are encountered in the surface of the ground for filling in such low spots. The positive actuation of the apron 32 in both directions, together with the construction of the body A, enables a positive and accurate control of the leveling or spreading action of the scraper.

Having thus described my invention, what I claim as new and desire to secure by Letters Patent of the United States, is:

1. In a vehicle of the class described, a receptacle body having opposite side walls, a scraper blade connected to and extending transversely of said side walls, means supporting said body at the front end for pivotal movement with respect thereto, an axle support for the rear end of said body, a supporting frame mounted on said axle support and having a bumper part extending rearwardly over said axle, a pusher frame having pivotal connections with said supporting frame and said body and operative to transmit a pushing force directly from said bumper to said scraper blade through the side walls of said body, said pusher frame being provided with supporting members projecting upwardly therefrom for engagement with the upper part of the rear end of said body, said supporting members being adapted to engage and provide a support for said body when in its lowered position, a member connecting the supporting frame with the upper rear portion of the body, and elevating means connected to said supporting frame and said body for elevating said body with respect to said supporting frame, said pusher frame being pivotally movable with respect to said supporting frame and said body to permit raising movement of said body relative to said support.

2. In a dirt scraping and hauling vehicle of the class described, in combination, a receptacle body, means to support said body for travel movement comprising a front wheel unit and a rear wheel and axle unit, instrumentalities intermediate the receptacle body and the rear wheel and axle unit for raising and lowering the receptacle body relatively to the front and rear wheel units, compression members included in the rear wheel and axle unit aforesaid and extending rearwardly from the vehicle to be engaged by a secondary pushing vehicle, said raising and lowering instrumentalities including a pusher frame intermediate the axle portion of the rear axle and wheel unit and the rear portion of the receptacle body, whereby forces transmitted to the compression members will be caused to be transmitted through the pusher frame to the rear portion of the receptacle body, and whereby the pusher frame is adapted to transmit forces applied to the compression members substantially in line with the line of application of the forces to the said members and said pusher frame including a part adapted to abut with the rear portion of the receptacle body to afford a bracing element for the latter, and scraping means carried by the receptacle body in respect to which the bracing element aforesaid cooperates during scraping action of the scraper means.

GEORGE A. VAUGHN.